(No Model.)　　　　　　　　　　　　　　　2 Sheets—Sheet 1.
C. GULLIKSEN.
TELEMETER.
No. 589,527.　　　　　　　　Patented Sept. 7, 1897.
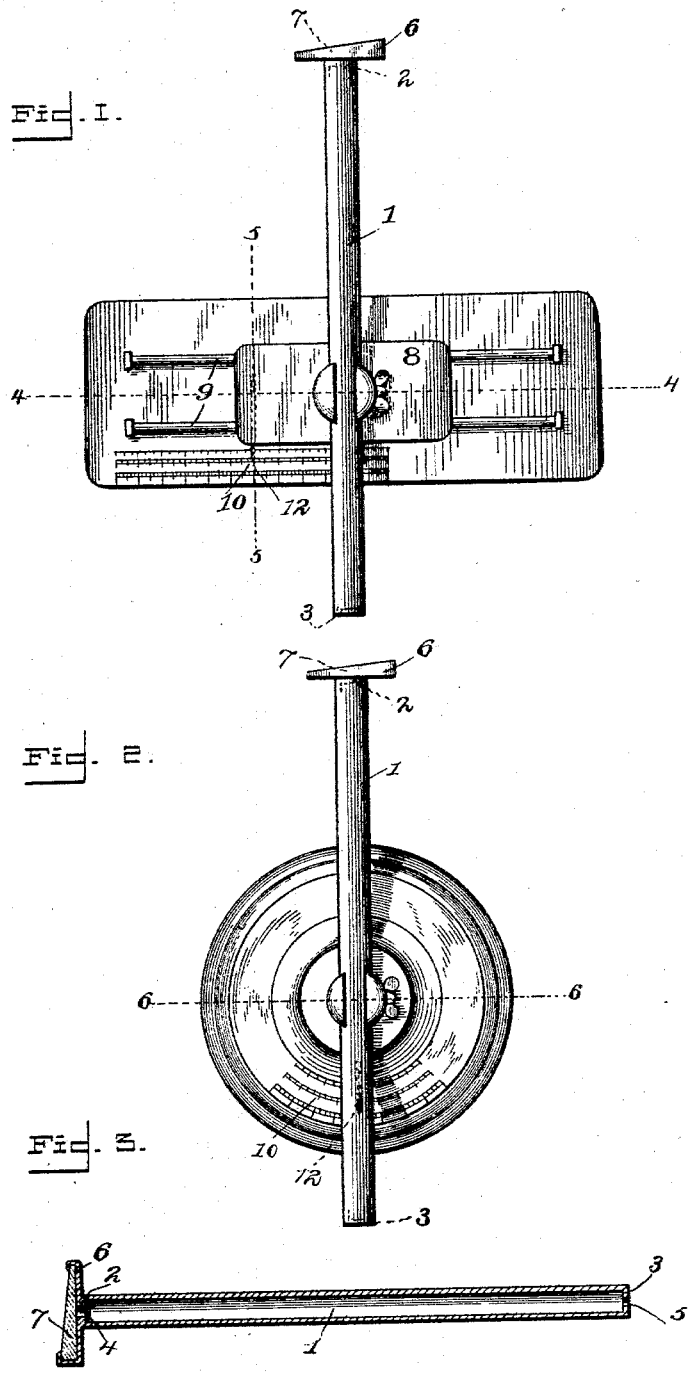
Witnesses:
Fenton S. Belt,
J. A. Billson.
Inventor:
Charles Gulliksen,
By H. B. Willson,
Attorney.

(No Model.)

C. GULLIKSEN.
TELEMETER.

No. 589,527.

2 Sheets—Sheet 2.

Patented Sept. 7, 1897.

Witnesses:
Fenton S. Belt.
J. A. Wilson.

Inventor:
Charles Gulliksen,
By H. B. Wilson,
Attorney.

UNITED STATES PATENT OFFICE.

CHARLES GULLIKSEN, OF GRAND FORKS, NORTH DAKOTA.

TELEMETER.

SPECIFICATION forming part of Letters Patent No. 589,527, dated September 7, 1897.

Application filed March 30, 1897. Serial No. 630,005. (No model.)

*To all whom it may concern:*

Be it known that I, CHARLES GULLIKSEN, a citizen of the United States, residing at Grand Forks, in the county of Grand Forks and State of North Dakota, have invented certain new and useful Improvements in Telemeters; and I do declare the following to be a full, clear, and exact description of the invention, such as will enable others skilled in the art to which it appertains to make and use the same.

My invention relates to a novel form of telemeter, and the object is to provide a simple and convenient device whereby a person may approximate the distance of a point or object without the aid of complicated mathematical calculation; and to this end the novelty consists in the construction, combination, and arrangement of the same, as will be hereinafter more fully described, and particularly pointed out in the claims.

In the accompanying drawings the same reference-characters indicate the same parts of the invention.

Figure 4:
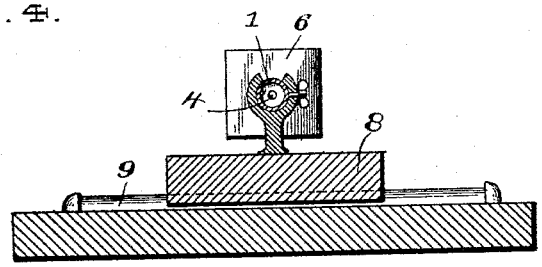
Figure 5:
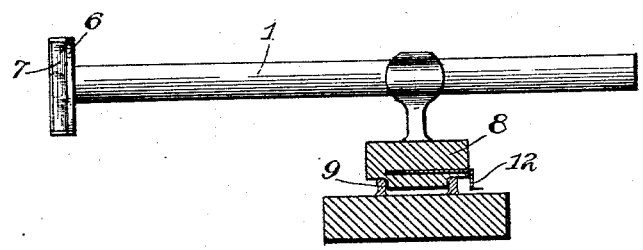
Figure 6:
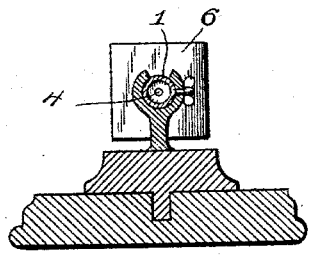

Figure 1 is a diagrammatic plan view of my improved telemeter. Fig. 2 is a modification of the same. Fig. 3 is an enlarged longitudinal section of the tube. Fig. 4 is a longitudinal section on the line 4 4 of Fig. 1. Fig. 5 is a transverse section on the line 5 5 of Fig. 1, and Fig. 6 is a longitudinal section on the line 6 6 of Fig. 1.

1 represents a cylindrical tube provided with two diaphragms 2 3, having the central alined visual apertures 4 5.

6 represents a rectangular frame fixed to one end of the tube and at a right angle to a line taken through the apertures 4 5.

7 represents a prism secured in said frame and having its contiguous plane face arranged parallel with the frame and at a right angle to the line of vision through the tube.

8 represents a sliding carriage in which the tube is mounted, and 9 a track on which the carriage slides, and 10 represents a graduated scale or index fixed on the track-platform, so as to be traversed by the pointer 12, fixed on the carriage.

According to the well-known laws of refraction, a point or object viewed through the prism-lens 7 will be refracted or deflected from a straight line, the degree of refraction depending on the angularity of the prism. Consequently the distance of an object from the point of vision can be approximately determined by taking advantage of this law of refraction, and to do this it is only necessary to remove the prism and bring the object in line with the tube when the pointer on the carriage is at the zero-point on the scale and then replace the prism and move the tube and carriage along the track until the object is brought into the line of vision through the prism when viewed through the tube and the distance read off on the scale.

In order to increase the scope of the telemeter, several prisms having different angles may be employed and correspondingly graduated scales arranged on the platform.

In the modification I have dispensed with the carriage and track and mounted the tube on a vertical shaft fixed in the platform, a pointer on the tube traversing the scale to indicate the degree of horizontal movement of the tube.

In some instances the tube may be provided with ordinary telescopic lenses to increase its efficiency.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new, and desire to secure by Letters Patent, is—

1. A telemeter comprising a support, a movable carriage mounted on the support, a sight-tube mounted on the carriage, a detachable prism in the tube, and a fixed scale and movable pointer, substantially as described.

2. The movable carrriage 8, provided with the pointer 12, the tube 1, provided with the prism 7 mounted on said movable carriage, and the stationary track provided with the fixed scale 10, substantially as shown and described.

In testimony whereof I hereunto affix my signature in presence of two witnesses.

CHARLES GULLIKSEN.

Witnesses:
A. G. BURR,
M. LANGARD.